United States Patent
Steichen et al.

(10) Patent No.: US 9,168,677 B2
(45) Date of Patent: Oct. 27, 2015

(54) CONTROLLING MOISTURE IN AND PLASTICIZATION OF BIORESORBABLE POLYMER FOR MELT PROCESSING

(71) Applicant: Abbott Cardiovascular Systems Inc., Santa Clara, CA (US)

(72) Inventors: Bethany Steichen, San Francisco, CA (US); Stephen Pacetti, San Jose, CA (US); Manish Gada, Santa Clara, CA (US); Thierry Glauser, Redwood City, CA (US); Lothar Kleiner, Los Altos, CA (US); Yunbing Wang, Sunnyvale, CA (US); James Oberhauser, Saratoga, CA (US); Ni Ding, San Jose, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 0 days.

(21) Appl. No.: 14/311,175

(22) Filed: Jun. 20, 2014

(65) Prior Publication Data
US 2014/0298675 A1    Oct. 9, 2014

Related U.S. Application Data

(62) Division of application No. 13/207,656, filed on Aug. 11, 2011, now Pat. No. 8,841,412.

(51) Int. Cl.
*B29B 13/06* (2006.01)
*B29C 47/10* (2006.01)
*B29C 47/76* (2006.01)
*B29C 47/92* (2006.01)
*B29C 47/00* (2006.01)

(52) U.S. Cl.
CPC ............... *B29B 13/065* (2013.01); *B29B 13/06* (2013.01); *B29C 47/0014* (2013.01); *B29C 47/0021* (2013.01); *B29C 47/0023* (2013.01); *B29C 47/1018* (2013.01); *B29C 47/76* (2013.01); *B29C 47/92* (2013.01); *B29C 47/1072* (2013.01); *B29C 2947/922* (2013.01); *B29C 2947/92228* (2013.01); *B29C 2947/92342* (2013.01); *B29C 2947/92695* (2013.01); *B29C 2947/92704* (2013.01); *B29C 2947/92723* (2013.01); *B29K 2995/006* (2013.01)

(58) Field of Classification Search
CPC ...... B29B 13/06; B29B 13/065; B29C 47/76; B29C 47/92; B29C 47/0014; B29C 47/0021; B29C 47/0023; B29C 47/1018; B29C 47/1072; B29C 2947/922; B29C 2947/92228; B29C 2947/92342; B29C 2947/92695; B29C 2947/92704; B29C 2947/92723; B29K 2995/006

See application file for complete search history.

(56) References Cited

U.S. PATENT DOCUMENTS

2011/0174434 A1* 7/2011 Hsiao .................. 156/244.17
2011/0306733 A1* 12/2011 Suzuki et al. ............ 525/415

FOREIGN PATENT DOCUMENTS

WO    WO2010/095656    *  8/2010

* cited by examiner

*Primary Examiner* — Frances Tischler
(74) *Attorney, Agent, or Firm* — Squire Patton Boggs (US) LLP

(57) ABSTRACT

Methods and systems for controlling the moisture content of biodegradable and bioresorbable polymer resin during extrusion above a lower limit that allows for plasticization of the polymer resin melt and below an upper limit to reduce or prevent molecular weight loss are disclosed. Methods are further disclosed involving plasticization of a polymer resin for feeding into an extruder with carbon dioxide and freon.

10 Claims, 4 Drawing Sheets

CONTROLLING MOISTURE IN AND PLASTICIZATION OF BIORESORBABLE POLYMER FOR MELT PROCESSING

This application is a division of application Ser. No. 13/207,656 filed Aug. 11, 2011 and is incorporated by reference herein.

BACKGROUND OF THE INVENTION

1. Field of the Invention

This invention relates to methods of manufacturing polymeric medical devices, in particular, stents.

2. Description of the State of the Art

This invention relates to manufacturing of biodegradable and bioresorbable medical devices. These devices include, but are not limited to radially expandable endoprostheses, that are adapted to be implanted in a bodily lumen. An "endoprosthesis" corresponds to an artificial device that is placed inside the body. A "lumen" refers to a cavity of a tubular organ such as a blood vessel. A stent is an example of such an endoprosthesis. Stents are generally cylindrically shaped devices that function to hold open and sometimes expand a segment of a blood vessel or other anatomical lumen such as urinary tracts and bile ducts. Stents are often used in the treatment of atherosclerotic stenosis in blood vessels. "Stenosis" refers to a narrowing or constriction of a bodily passage or orifice. In such treatments, stents dilate stenotic regions, hold dissections in place, and prevent vasospasm and abrupt closure following angioplasty in the vascular system. A complication following stenting or balloon angioplasty is restenosis. "Restenosis" refers to the reoccurrence of stenosis in a blood vessel or heart valve after it has been treated (as by balloon angioplasty, stenting, or valvuloplasty) with apparent success.

Stents are typically composed of scaffolding that includes a pattern or network of interconnecting structural elements or struts, formed from wires, tubes, or sheets of material rolled into a cylindrical shape. This scaffolding gets its name because it physically holds open and, if desired, expands the wall of the passageway. Typically, stents are capable of being compressed or crimped onto a catheter so that they can be delivered to and deployed at a treatment site.

Delivery includes inserting the stent through small lumens using a catheter and transporting it to the treatment site. Deployment includes expanding the stent to a larger diameter once it is at the desired location. Mechanical intervention with stents has reduced the rate of restenosis as compared to balloon angioplasty.

Stents are used not only for mechanical intervention but also as vehicles for providing biological therapy. Medicated stents provides biological therapy through local administration of a therapeutic substance. A medicated stent may be fabricated by coating the surface of either a metallic or polymeric scaffolding with a polymeric carrier that includes an active or bioactive agent or drug. A polymeric scaffolding may also serve as a carrier of an active agent or drug.

A biodegradable stent must be able to satisfy a number of mechanical requirements. The stent must be capable of withstanding the structural loads, namely radial compressive forces, imposed on the stent as it supports the walls of a vessel. Therefore, a stent must possess adequate radial strength. Radial strength, which is the ability of a stent to resist radial compressive forces, relates to a stent's radial yield strength and radial stiffness around a circumferential direction of the stent. A stent's "radial yield strength" or "radial strength" (for purposes of this application) may be understood as the compressive loading, which if exceeded, creates a yield stress condition resulting in the stent diameter not returning to its unloaded diameter, i.e., there is irrecoverable deformation of the stent. When the radial yield strength is exceeded the stent is expected to yield more severely and only a minimal force is required to cause major deformation.

A biodegradable stent may be designed to fulfill it clinical purpose and then be resorbed. Once expanded, such a stent should adequately maintain its size and shape for a period of time to maintain patency or provide structural tissue support of a blood vessel despite the various forces that may come to bear on it, including the cyclic loading induced by the beating heart. In an exemplary treatment, a stent provides patency to a lumen for a period of time, its mechanical properties decline, it loses structural integrity, and then it is resorbed.

However, there are several challenges in making a bioabsorbable polymeric stent that provides desirable treatment outcomes. The mechanical and degradation behavior of a biodegradable stent, and the potential clinical outcomes, are quite sensitive to the properties of the biodegradable polymer of a finished product. These challenges include developing manufacturing methods that provide properties of the finished product that provide the desirable treatment outcomes.

INCORPORATION BY REFERENCE

All publications and patent applications mentioned in this specification are herein incorporated by reference to the same extent as if each individual publication or patent application was specifically and individually indicated to be incorporated by reference, and as if each said individual publication or patent application was fully set forth, including any figures, herein.

SUMMARY OF THE INVENTION

Various embodiments of the present invention include a method comprising: providing a biodegradable or bioresorbable polymer resin as feed to an extruder for an extrusion process; passing a drying gas through the polymer resin during the extrusion process prior to being fed into the extruder to remove moisture from the polymer resin, wherein the drying gas has substantially no moisture content prior to passing through the polymer resin; maintaining the moisture content of the polymer resin during the extrusion process prior to being fed into the extruder in a selected range between 50 ppm and 1000 ppm; and adjusting the temperature of the drying gas, the flow rate of the drying gas, or both to maintain the moisture content of the polymer resin in the selected range.

Further embodiments of the present invention a method comprising: providing a biodegradable polymer resin as feed to an extruder for an extrusion process; controlling the moisture content of the polymer resin during the extrusion process prior to feeding to the extruder to be within a selected range between 50 ppm and 1000 ppm; and adjusting the moisture content of a drying gas stream passing through the polymer resin to control the moisture content of the polymer resin.

Additional embodiments of the present invention include a system comprising: a resin hopper for holding polymer resin having an outlet port for connecting to an extruder for feeding the polymer resin through the outlet port to the extruder; a source of a dry gas stream and conduits for carrying the dry gas stream from the dry gas stream source; a source of a moist gas stream and a conduit for carrying the moist gas stream from the moist gas stream source, wherein the conduit from the moist gas stream source is configured to inject the moist gas stream into the dry gas stream to form a drying gas stream; a conduit for carrying the drying gas stream into a gas inlet port to the resin hopper; a conduit for carrying the drying gas stream from a gas outlet port from the resin hopper; a sensor to monitor moisture content of the drying gas; and a controller that generates a signal to adjust the moisture content of the drying gas based on the monitored moisture content of the drying gas.

Other embodiments of the present invention include a method comprising: providing a biodegradable polymer resin as feed to an extruder for an extrusion process; and passing a gas containing dry carbon dioxide through the polymer resin prior to entering the extruder during the extrusion process, wherein the polymer resin absorbs some of the carbon dioxide which reduces melt viscosity of the polymer resin in the extruder during the extrusion process, wherein the gas may also reduce the moisture content of the polymer resin prior to entering the extruder.

Additional embodiments of the present invention include a method comprising: providing a biodegradable polymer resin as feed to an extruder for an extrusion process; and passing a gas containing freon or one of its replacement gases currently on the market through the polymer resin prior to entering the extruder during the extrusion process, wherein the polymer resin absorbs some of the freon which reduces melt viscosity of the polymer resin in the extruder during the extrusion process, wherein the gas may also reduce the moisture content of the polymer resin prior to entering the extruder.

DETAILED DESCRIPTION OF THE INVENTION

Various embodiments of the present invention relate to manufacture of polymeric implantable medical devices. In particular, the embodiments include methods of conditioning biodegradable polymer resin for melt processing. Such melt processing methods may be used to form polymer constructs from the conditioned resin that are subsequently processed to form implantable medical devices. Alternatively, such melt processing methods may form implantable medical devices directly from the resin. Melting processing methods can include, but are not limited to, extrusion, injection molding, injection blow molding, compression molding, or batch melt processing.

The methods described herein are generally applicable to any amorphous or semi-crystalline polymeric implantable medical device, especially those that have load bearing portions when in use or have portions that undergo deformation during use. In particular, the methods can be applied to tubular implantable medical devices such as self-expandable stents, balloon-expandable stents, and stent-grafts.

Figure 1:
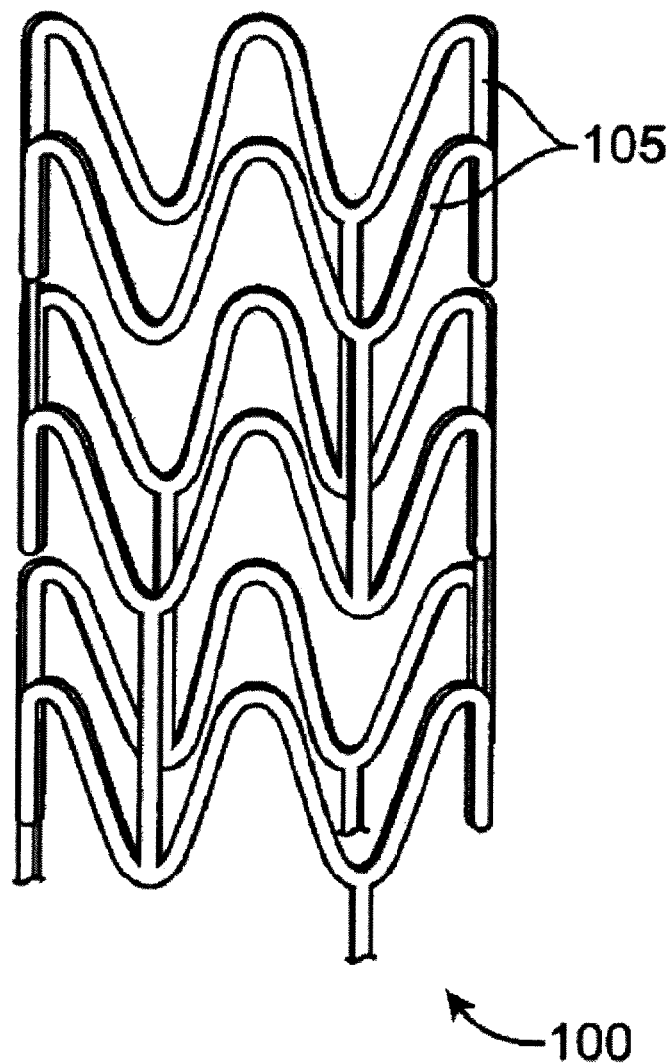
FIG. 1 depicts a stent.

A stent may include a pattern or network of interconnecting structural elements or struts. FIG. 1 depicts a view of a stent 100. In some embodiments, a stent may include a body, backbone, or scaffolding having a pattern or network of interconnecting structural elements 105. Stent 100 may be formed from a tube (not shown). The structural pattern of the device can be of virtually any design. The embodiments disclosed herein are not limited to stents or to the stent pattern illustrated in FIG. 1. The embodiments are easily applicable to other patterns and other devices. The variations in the structure of patterns are virtually unlimited.

A stent such as stent 100 may be fabricated from a polymeric tube or a sheet by rolling and bonding the sheet to form the tube. A tube or sheet can be formed by extrusion or injection molding. A stent pattern, such as the one pictured in FIG. 1, can be formed in a tube or sheet with a technique such as laser cutting or chemical etching. The stent can then be crimped on to a balloon or catheter for delivery into a bodily lumen.

An implantable medical device of the present invention can be made partially or completely from a biodegradable, bioresorbable, bioabsorbable, or biostable polymer. A polymer for use in fabricating an implantable medical device can be biostable, bioresorbable, bioabsorbable, biodegradable or bioerodable. Biostable refers to polymers that are not biodegradable. The terms biodegradable, bioresorbable, bioabsorbable, and bioerodable are used interchangeably and refer to polymers that are capable of being completely degraded and/or eroded into different degrees of molecular levels when exposed to bodily fluids such as blood and can be gradually resorbed, absorbed, and/or eliminated by the body. The processes of breaking down and absorption of the polymer can be caused by, for example, hydrolysis and metabolic processes.

A stent made from a biodegradable polymer is intended to remain in the body for a duration of time until its intended function of, for example, maintaining vascular patency and/or drug delivery is accomplished. After the process of degradation, erosion, absorption, and/or resorption has been completed, no portion of the biodegradable stent, or a biodegradable portion of the stent will remain. In some embodiments, very negligible traces or residue may be left behind.

The duration of a treatment period depends on the bodily disorder that is being treated. In treatments of coronary heart disease involving use of stents in diseased vessels, the duration can be in a range from several months to a few years. The duration is typically up to about six months, twelve months, eighteen months, or two years. In some situations, the treatment period can extend beyond two years.

A stent has certain mechanical requirements such as high radial strength, high stiffness or high modulus, and high fracture toughness. A stent that meets such requirements greatly facilitates the delivery, deployment, and treatment of a diseased vessel. With respect to radial strength and stiffness, a stent must have sufficient radial strength to withstand structural loads, namely radial compressive forces, imposed on the stent so that the stent can support the walls of a vessel at a selected diameter for a desired time period. A polymeric stent with inadequate radial strength and/or stiffness can result in an inability to maintain a lumen at a desired diameter for a sufficient period of time after implantation into a vessel. In vessels which undergo a great deal of movement, such as those of the extremities, the polymeric stent must be able to accommodate these deformations and return to its original shape. This reversibility requires a higher degree of elasticity and crush resistance than that needed for stenting a coronary vessel.

In addition, the stent should possess sufficient toughness or resistance to fracture to allow for crimping, expansion, and cyclic loading. These aspects of the use of the stent involve deformation of various portions of the stent. Sufficient toughness is important to prevent cracking or fracture during use which could lead to premature mechanical failure of the stent.

The strength deficiency of polymers compared to metals may be addressed by incorporating a deformation step in the stent fabrication process by subjecting the polymer construct to deformation. Deforming polymers tends to increase the strength along the direction of deformation, which is believed to be due to the induced polymer chain orientation along the direction of deformation.

Semi-crystalline polymers that are stiff or rigid under biological conditions or conditions within a human body are particularly suitable for use as a scaffolding material. Specifically, polymers that have a glass transition temperature (Tg) sufficiently above human body temperature which is approximately 37° C., should be rigid upon implantation. Poly(L-lactide) (PLLA) is an example of such a polymer.

Additional exemplary biodegradable polymers for use with a bioabsorbable polymer scaffolding include poly(D-lactide) (PDLA), polyglycolide (PGA), poly(L-lactide-co-D, L-lactide) (PLDLA), poly(D,L-lactide) (PDLLA), poly(D,L-lactide-co-glycolide) (PLGA) and poly(L-lactide-co-glycolide) (PLLGA). With respect to PLLGA, the stent scaffolding can be made from PLLGA with a mole % of GA between 5-15 mol %. The PLLGA can have a mole % of (LA:GA) of 85:15 (or a range of 82:18 to 88:12), 95:5 (or a range of 93:7 to 97:3), or commercially available PLLGA products identified as being 85:15 or 95:5 PLLGA. The examples provided above are not the only polymers that may be used. Many other examples can be provided, such as those found in Polymeric Biomaterials, second edition, edited by Severian Dumitriu; chapter 4.

Detailed discussion of the manufacturing process of a bioabsorbable stent can be found elsewhere, e.g., U.S. Patent Publication No. 20070283552. The fabrication methods of a bioabsorbable stent can include the following steps:

(1) forming a polymeric tube from a biodegradable polymer resin using extrusion, (2) radially deforming the formed tube to increase radial strength, (3) forming a stent scaffolding from the deformed tube by laser machining a stent pattern in the deformed tube with laser cutting, in exemplary embodiments, the strut thickness can be 100-200 microns, or more narrowly, 120-180, 130-170, or 140-160 microns, (4) optionally forming a therapeutic coating over the scaffolding, (5) crimping the stent over a delivery balloon, and (6) sterilization with election-beam (E-beam) radiation.

With respect to step (1), an extruder generally includes a barrel through which a polymer melt is conveyed from an entrance to an exit port. The polymer resin is typically fed into an extruder from a container called hopper. The hopper can be unsealed and allow exposure of the resin to the ambient air, or alternatively, it can be sealed to minimize prevent such exposure. The resin is feed to the extruder barrel near its proximal end from the hopper as a solid, for example, in the form of a pellet or granule. The solid polymer is melted as it is conveyed through the barrel and mixed, for example, through interaction with rotating screws. The polymer in the extruder barrel is heated to temperatures above the melting temperature (Tm) of the polymer and exposed to pressures that are generally far above ambient. Since the viscosity and temperature are inversely related for a polymer, the extrusion temperature is raised to a level that allows a desired flow rate of polymer through the extruder.

The processing parameters of some or all manufacturing steps are crucial to providing a finished stent product that provides mechanical properties and degradation properties important for a desired clinical outcome. Degradation properties include both the time dependence of mechanical properties and the biodegradation or bioresorption rate, e.g., time for complete resorption. The inventors have found properties and clinical behavior of the finished stent product are quite sensitive to certain processing parameters.

Figure 2:
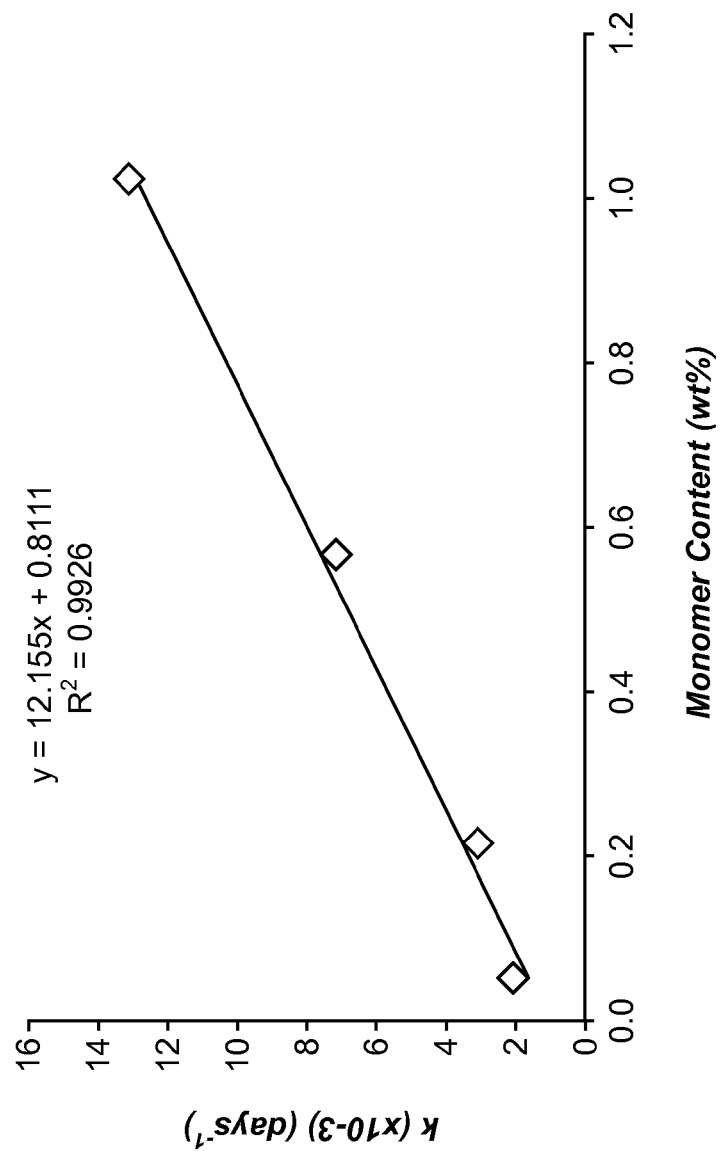
FIG. 2 depicts the effect of monomer content on a PLLA scaffold degradation rate constant, k, from in vitro studies.

In particular, studies by inventors have shown that the degradation profile of poly(L-lactide) is strongly dependent on number average molecular weight (Mn) of the finished stent product and the degradation rate constant of PLLA, U.S. patent application Ser. No. 13/104,732. In systematic studies, the inventors have found that the degradation rate constant of PLLA is strongly dependent on the L-lactide (LLA) monomer content. FIG. 2 depicts the effect of LLA monomer content on a PLLA scaffold degradation rate constant, k, from in vitro studies. Therefore, the hydrolytic degradation of a PLLA scaffold has been shown to increase with an increase in LLA monomer content. As a result, the Mn and radial strength as a function of time also depend on LLA monomer content. In vitro bioresorption studies of PLLA scaffolds with different LLA monomer concentrations demonstrated that Mn degrades faster as the LLA monomer content increases. These studies also demonstrated that as the LLA monomer content increases the radial strength of the scaffold is maintained for a shorter period of time.

It has further been found that the processing steps that cause the most significant decrease in molecular weight of PLLA are extrusion (or more generally, melt processing) and e-beam sterilization. Additionally, it has been found that the principal source of LLA monomer generation is the extrusion step. Both the drop in molecular weight and monomer generation increases with extrusion temperature.

Thus, extrusion of a biodegradable polymer resin, such as PLLA resin, into tubing for stent fabrication is a critical manufacturing step since stent properties (Mn and L-lactide monomer content) important in clinical behavior depend on extrusion parameters. The extrusion step is a challenge both because of the resin properties and the many tubing requirements which must be met.

One challenge is that the high molecular weight PLLA (e.g., Mn of 260 to 370 kDa) resin used has a high inherent viscosity (3.3-4.3 dl/g). The inherent viscosity (of a polymer) is the ratio of the natural logarithm of the relative viscosity, $\eta_r$, to the mass concentration of the polymer, c, i.e., $\eta_{inh} = \ln(\eta_r/c)$. High temperatures and pressures are required to extrude, or generally, to melt process such a resin. For example, parameters include an extrusion temperature between 210 and 260 deg C., an extruder barrel pressure of about 2000 psi, and a residence time of about 10 min. It is believed that the high temperature, high shear, and long residence time causes thermally-induced chain scission that results in a large drop in molecular weight, for example, from a pre-extrusion Mn of 265 kDa to a post-extrusion Mn of 180 kDa.

A lower IV or molecular weight resin would be much easier to process (lower temperature, pressure, shear), but the final Mn of the finished stent product may be too low for a desired clinical outcome due to the drop in Mn from both extrusion and sterilization. The magnitude of the radial strength and the time that radial strength is maintained decrease as the Mn of the finished stent product decreases. The Mn of the finished product must be high enough so that the radial strength is high enough to support a vessel and will be maintained for a sufficient time.

Additionally, the inventors have found in processing PLLA that a melt processing temperature that is too high leads to excessive monomer generation as well as oligomers, all of which affect subsequent degradation time of a finished good implanted in a patient. It is believed that monomer generation is caused by a transesterification reaction (end group back biting). This depolymerization reaction is caused by a combination of exceeding a critical temperature and residence time during extrusion, which causes this additional degradation mechanism. An increased degradation rate decreases the time to complete absorption and also shortens the time that radial strength is maintained. Thus, there is an upper limit to the monomer content for satisfactory stent performance. For LLA monomer in PLLA, LLA may generally be less than 1 wt %. As indicated above, higher temperatures and melt residence times during extrusion to process the high IV resin increases monomer content.

Other challenges include that (1) a small variation in IV leads to significant process changes, since viscosity is proportional to $(IV)^5$; (2) strict specifications must be met for the tubing dimensions of ID, OD, concentricity, and ovality; and (3) gel counts must be low, which requires a dense screen pack. This leads to high operating pressures and additional localized shear heating.

Another significant challenge in extrusion is addressing moisture content of the biodegradable polymer resin. Studies by inventors indicated that the moisture level in PLLA resin was a critical parameter for control of both molecular weight and monomer content during extrusion. The inventors have recognized that both too much moisture and too little moisture in the resin during extrusion can have an undesirable impact of the properties of the extruded construct and in the final stent product.

The inventors have found that when the moisture level of the resin was too high (e.g., greater than 1000 ppm), molecular weight degradation or loss of the resin IV increased. It is believed that the increased molecular weight loss arises from chain scission due to more hydrolysis at the high processing temperature. This was observed even if the extrusion was done at a temperature as low as 210 deg C. (410 deg F).

It was found from studies that when the moisture content was too low (e.g., lower than 50 ppm), the melt viscosity of the PLLA resin in the extruder increased. As a result the processing temperature in the extruder was increased to maintain product quality and consistency (e.g., maintain transparency of extruded product), for example, the temperature was increased to 238 deg C. (460 deg F) and above. It is believed that moisture content in a polymer resin melt acts as a significant plasticizer which decreases melt viscosity. Thus, it is believed the increased melt viscosity at the low moisture content was due to loss of or decrease in the degree of the plasticizing effect. An increase in molecular weight loss and monomer generation was observed in tubes extruded at the higher temperatures from the low moisture content resin. It is believed that these effects are caused at least in part to the increase in reactions that reduce molecular weight and generate monomer.

A conventional method of reducing moisture content in PLLA resin was implemented by the inventors. In this method, the PLLA resin was dried in a vacuum oven to a very low level, less than 5 ppm. For example, the resin was baked in a vacuum oven at about 60 deg C. for 6 hours and then at about 120 deg C. for about 6 hours. The dried resin was then transferred to an open hopper of the extruder several times during the extrusion process. It was found that once the dried resin was transferred to the open hopper, its moisture level increased during extrusion. Product consistency was found to be inconsistent. Specifically, the monomer content of the tubes extruded during extrusion runs was found to vary. As time progressed, the monomer content of the tubes was found to decrease. It is believed that the moisture content of resin entering the extruder increased with time since the resin with the longer residence time in the open hopper absorbed moisture from the environment in the facility. It is hypothesized that the low moisture content resin with the shorter residence time in the hopper entering at the start of the extrusion run had a higher melt viscosity which mechanical degradation due to shear which can result in random chain scission.

Therefore, to summarize, too high of a moisture content results in increased molecular weight loss and too low of moisture content results in increased monomer generation and molecular weight loss. High moisture content causes hydrolytic degradation, which is random. Monomer content is increased when a critical temperature (approximately 220 to 240 deg C.) and critical residence time are exceeded (approximately 13 minutes). There are three degradation mechanisms in play simultaneously: (1) mechanical degradation due to shear which causes random chain scission; (2) hydrolytic degradation which also causes chain scission; and (3) monomer generation which essentially is depolymerization. All three occur at the same time and the extent of each depends upon the complexity of shear, temperature, residence time, and moisture content.

Thus, based on the above studies, it was found that methods were needed to control the moisture content of polymer resin during extrusion above a lower limit that allows for plasticization of the polymer resin melt and below an upper limit to reduce molecular weight loss observed at higher moisture content. The upper moisture limit is low enough so as not to result any or significant hydrolytic degradation. Additionally, methods are needed to plasticize the biodegradable resin to a consistent level with water or other agents. Consistent plasticization of the PLLA resin during extrusion facilitates achieving both uniform and consistent extruded product, e.g., tube appearance, molecular weight, monomer content, and other properties. Exemplary lower limits can include 50, 100, 150, 200, 250, 300, 350, and 400 ppm. Exemplary upper limits include 100, 200, 300, 500, 700, 1000, 2000, and 3000 ppm. Exemplary ranges include any combination of the above lower limits with any of the upper limits that is higher. An exemplary preferred range may be 50 to 1000 ppm. When the extrusion temperature (molten PLLA) is lower, the moisture content can be higher.

Certain embodiments of controlling moisture in a polymer resin for extrusion include placing the polymer resin in a container with an outlet for feeding to the resin to the extruder. The container may be referred to as a hopper drier. The resin may be fed directly from the container into the extruder. The container is sealable to minimize or prevent exposure of the polymer resin to ambient moisture, i.e., ambient air that has a moisture content depending upon relative humidity. In certain practical implementations, there is leakage of ambient moisture into the sealed container prior to and during extrusion to maintain a low, but stable or constant moisture level in the PLLA. Prior to starting extrusion, the resin in the sealed container may be dried by circulating a drying gas through the resin to reduce the moisture content of the polymer resin to a very low level. For example, the resin may be dried to a moisture content between 50 and 1000 ppm, or more narrowly, 100 to 500 ppm, or 100 to 300 ppm. The drying time may be, for example, 1 to 6 hours, or more, narrowly 4 to 6 hours, or greater than 6 hours.

The drying gas may be a low moisture content gas such as air or nitrogen. The drying gas may be supplied by a source such as a compressed gas tank. After passing the dry gas stream through the resin, the gas stream may be passed through a desiccant bed to remove moisture from the gas absorbed from the resin. The gas may then be recycled to the resin. Exemplary equipment for drying a polymer resin in a hopper is a Dri-Air desiccant dryer from Dri-Air Industries, Inc. of East Windsor, Conn.

The drying gas passed through the resin may be free or substantially free of moisture. For example, the drying gas may be air with a dew point of less than −40 or −45 deg C. A moisture sensor can monitor the moisture content (e.g., dew point temperature, relative humidity) of the drying gas prior to circulating the drying gas through the resin. The temperature of the drying process may correspond to the temperature of the drying gas or the temperature inside the container. The drying temperature may be 25 to 70 deg C., or more narrowly, 25 to 30 deg C., 30 to 40 deg C., 40 to 50 deg C., 50 to 60 deg C., or 60 to 70 deg C. Temperature sensors can monitor the temperature of the drying gas prior to passing through the container and the temperature inside the container. The flow rate of drying gas may be 5 to 15 $m^3$/hr at the drying temperature. During extrusion, the drying gas circulation through the resin may be maintained. A higher temperature may be preferred since the rate of removal of the moisture from the resin is faster at higher temperatures. Therefore, the drying time required to reach a selected range of moisture content decreases with increasing temperature.

In some embodiments, the moisture level of the resin may be controlled to be in a selected range during extrusion. Maintaining the pre-extrusion drying conditions may cause the moisture content of the resin to continue to decrease. Therefore, since the drying is free or substantially free of moisture, continued circulation of the drying gas may reduce the moisture content of the resin below a desired lower limit.

The moisture level of the drying gas inside the container or after exiting the container may be monitored by moisture sensors that measure the relative humidity or the ppm of moisture. High precision humidity sensors are available from Vaisala of San Jose, Calif. Alternatively, a sample of resin may be removed from the container and the moisture content of the resin determined. The drying temperature, the flow rate of drying gas, or both may be adjusted to maintain the moisture content of the resin in a desired range, in particular, above the lower limit.

In certain embodiments, the temperature of the drying gas or container may be decreased to control the moisture content of the resin. In exemplary embodiments, the temperature may be decreased from 60 to 70 deg C. to 25 to 30 deg C., or more generally, decreased by 5, 10, 15, 20, 30, 35, or 40 deg C. In exemplary embodiments, the flow rate can be decreased to maintain the moisture content of the resin above the lower limit. The flow rate can be decreased to 75 to 95%, 50 to 75%, 25 to 50%, 10 to 25%, or less than 10% of the initial flow rate. In some embodiments, the flow rate of the drying gas may be stopped for a period of time after the start of extrusion.

The moisture content can be monitored periodically after such adjustment(s). If the moisture content rises above an upper limit after such adjustments, the temperature, flow rate of drying gas, or both can be adjusted to maintain the moisture content of the resin below the upper limit. In exemplary embodiments, the temperature may increased by 5, 10, 15, 20, 30, 35, or 40 deg C. In exemplary embodiments, the flow rate of the drying gas can be increased to maintain the moisture content of the resin below the upper limit. The flow rate may be increased to 75 to 100%, 50 to 75%, 25 to 50%, or 10 to 25% of the initial flow rate. In some embodiment, the flow rate can be restarted after having been turned off and returned to an initial level, a higher level, or lower level.

Figure 3:
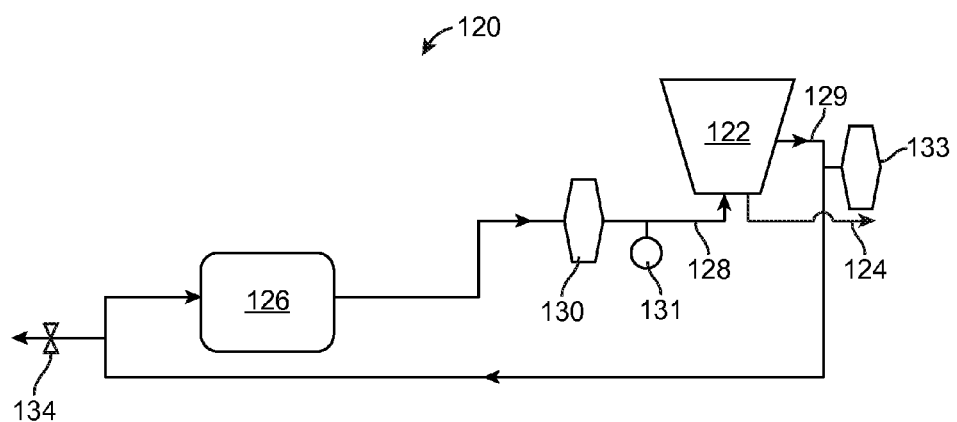
FIG. 3 depicts a schematic representation of an exemplary system for controlling moisture content of a polymer resin prior to and during extrusion.

FIG. 3 depicts a schematic representation of an exemplary system 120 for controlling moisture content of a polymer resin prior to and during extrusion. System 120 includes a resin hopper 122 that holds resin that is fed to an extruder (not shown) as shown by an arrow 124. A drying gas stream 128 enters hopper 122 and passes through the resin in the hopper. The temperature and humidity of drying gas 128 is monitored prior to entering hopper 122 by temperature and humidity sensors 130. A drying gas stream 129 exits hopper 122 after having passed through and removed moisture from the resin. A humidity sensor 133 monitors the humidity of drying gas stream 129. A pressure sensor 131 monitors the pressure of drying gas stream 128. Drying gas stream 129 is directed to a dryer unit 126, such as a desiccant bed, to remove moisture from the drying gas absorbed from the polymer resin. System 120 can include two desiccant beds (not shown). Drying gas may be directed through one bed while the other is regenerated (moisture is removed). An overpressure valve 134 releases excess pressure from the system. Dryer unit 126 removes moisture from drying gas stream 129 to generate drying gas stream 128 that is free or substantially free of moisture. The temperature of the drying gas can be adjusted by a heat exchanger (not shown) to control the moisture content of the resin. The flow rate of the drying gas can be increased or decreased by a flow rate controller (not shown).

Further embodiments of the present invention include controlling the moisture content of a polymer resin during extrusion to be within a selected range or to be within a specified tolerance of a target value by adjusting the moisture content of a drying gas stream passing through the polymer resin. The selected range may be between a lower limit and upper limit, as disclosed above. In such embodiments, the polymer resin may be contained in a sealed container, as described above, which minimizes or prevents leakage of ambient moisture into the container or a hopper drier with a slight positive pressure when compared to the outside environment. The adjustment of the moisture content of the drying gas stream may be based on the moisture content of the drying stream before passing through the polymer resin, after passing through the polymer resin, or both.

The specified tolerance refers to a specified permissible deviation from a target value above, below, or both above and below the target value. The specified tolerance from the target value of the polymer resin moisture content may be less than 1 ppm, 1 to 2 ppm, 2 to 3 ppm, 2 to 5 ppm, 5 to 10 ppm, 10 to 15 ppm, 10 to 20 ppm, 15 to 20 ppm, 20 to 30 ppm, 30 to 50 ppm, 50 to 100 ppm 100 to 200 ppm, or greater than 200 ppm.

In some embodiments, the adjustment of the moisture content of the drying gas may include increasing or decreasing the moisture content of the drying gas stream in order to maintain the polymer resin moisture content within the selected range. Although the temperature of the resin hopper or drying gas can be varied during the process, the moisture content of the resin can be controlled within the selected range without adjusting the temperature of the drying process. The flow rate of the drying gas may be adjusted, however, the moisture content of the resin can be controlled without adjusting the flow rate of a dry gas stream that is free of moisture. As described below, the flow rate adjustment of the drying gas may be due to injection of a moist gas stream into a dry gas stream.

A relationship between the moisture content of the polymer resin in the sealed container and the moisture content of the drying gas may be used to determine adjustments to the moisture content of the drying gas that maintain the moisture content of the polymer resin within the selected range. Specifically, a selected range of moisture content of polymer resin may correspond to a selected range of moisture content of drying gas. This relationship depends on the temperature of the drying gas. Therefore, at a given temperature, control of the moisture content of the drying gas within the selected range will control the moisture content of the polymer resin within a corresponding selected range. The moisture content of the drying gas may be monitored, for example, in terms of relative humidity and the corresponding moisture content of the polymer resin may be in terms of ppm. The relative humidity of the drying gas stream can be monitored instantaneously with inline sensors that can provide instantaneous feedback for adjusting the moisture content of the drying gas. Measurement of moisture content of polymer resin separately does not allow for such feedback since such measurements are performed offline and take several minutes to perform.

The relationship between the moisture content of the polymer resin in the sealed container and the moisture content of the drying gas may be determined experimentally. For example, at a selected temperature, the moisture content of a polymer resin as function of the moisture content of the drying gas may be determined. The corresponding ranges may be identified from such data.

The method can include selecting a temperature of a drying stream for maintaining the moisture content of the polymer resin in the selected range or target value. The moisture content range or target value of the drying stream is provided that corresponds to the selected range or target value of polymer resin moisture content at the selected temperature. The moisture content of the drying gas may then be maintained in the selected range or target value of the drying stream moisture content. The maintaining can correspond to adjusting the moisture content of the drying stream when the moisture content of the drying stream deviates from the selected range or from the target value by a specified tolerance.

For example, at a selected temperature, a target moisture content of the resin corresponds to a target moisture content of the drying gas. The measured moisture content of the drying gas is compared to the target moisture content of drying gas. The moisture content of the drying gas may then be adjusted to maintain the drying gas moisture content within a specified tolerance of the target moisture content.

The adjustments to the moisture content of the drying gas can be based on the moisture content of the drying gas measured at the entrance to the resin container. Alternatively, the adjustments to the moisture content of the drying gas can be based on the moisture content of the drying gas measured after passing through the resin at the exit of the resin container. Another preferred method is to base adjustments to the moisture content of the drying gas on both the moisture content at the exit and entrance of the resin container, and the difference between the two moisture contents. In this case, the target value for the moisture content of the drying gas at the entrance and exit is the target moisture content that corresponds to the target resin content. In addition, the target difference between the drying gas moisture content at the entrance and exit is zero since this represents and equilibrium condition. Thus, the moisture content of the drying gas is adjusted to maintain the moisture content at the exit and entrance to be within a specified tolerance and to be within a specified tolerance of the equilibrium condition.

In certain embodiments, the drying gas stream can include a first gas stream and the moisture content can be varied by injecting in a second gas stream having a higher moisture content into the first gas stream. The moisture content of the drying gas stream can be increased by increasing the injection flow rate of the second gas stream into the first gas stream. In some embodiments, the first gas stream can be a dry gas stream that is free or substantially free of moisture, as described above. For example, the first gas stream has a dew point less than −40 or −45 deg C.

Figure 4:
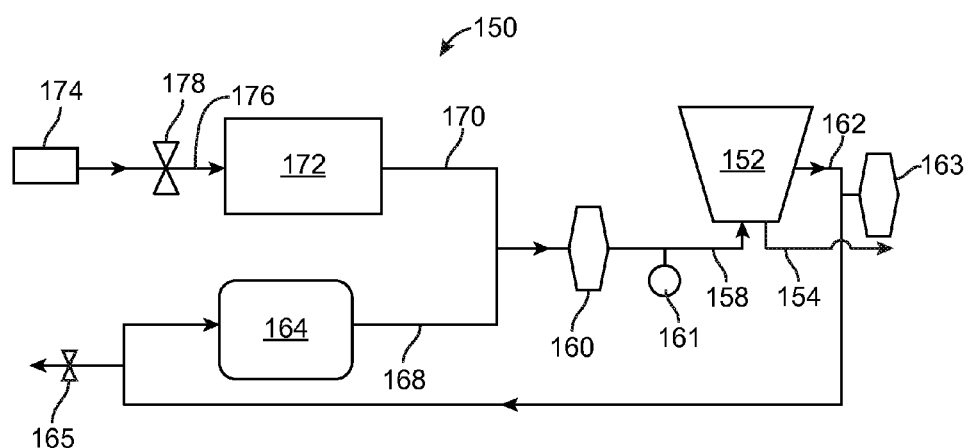
FIG. 4 depicts a schematic representation of an exemplary system for controlling moisture content of a polymer resin prior to and during extrusion with a drying gas having variable moisture content.

FIG. 4 depicts a schematic representation of an exemplary system 150 for controlling moisture content of a polymer resin prior to and during extrusion with a drying gas having variable moisture content. System 150 includes a resin hopper 152 that holds resin that is fed to an extruder (not shown) as shown by an arrow 154.

A drying gas stream 158 enters hopper 152 and passes through the resin in the hopper. The temperature and humidity of drying gas 158 is monitored prior to entering hopper 152 by temperature and humidity sensors 160. A drying gas stream 162 exits hopper 152 after having passed through the resin. A moisture sensor 163 monitors the moisture (e.g., humidity) of drying gas stream 162. A sensor 161 monitors the pressure of drying gas stream 158. Drying gas stream 162 is directed to a drier unit 164, such as a desiccant bed. An overpressure valve 165 releases excess pressure from the system. The drier unit 164 removes moisture from drying gas stream 162 to generate a dry gas stream 168 that is free or substantially free of moisture. Drying gas stream 158 is generated by injecting a moist gas stream 170 into dry gas stream 168. The moisture content of the drying gas stream 158 is varied by adjusting amount of moist gas stream 170 that is combined with dry gas stream 168.

Moist gas stream 170 is generated by a humidity conditioning unit 172. A gas stream 176 regulated by flow controller 178 is supplied from a compressed gas source 174 to unit 172. The humidity conditioning unit 172 can supply moist gas stream 170 that has a constant moisture content at a selected value, such as a selected relative humidity. The moisture content of drying gas stream 158 is adjusted by adjusting the flow rate of moist gas stream 170. This adjustment may be performed by varying the flow rate of gas stream 176 to humidity conditioning unit 172 with flow rate controller 178. The adjustment of the moisture content of drying gas stream 158 through adjustment of the flow rate of gas stream 176 is based on relative humidity (RH) measurements of drying gas stream 158 at the entrance and exit of hopper 152. RHentr and RHexit are compared to a target RH and ABS(RHentr−RHexit) is compared to the target value of zero. Adjustments are made to the flow rate so that these quantities are within a specified tolerance of the target values.

The humidity conditioning unit may be obtained from Parameter Generation & Control of Black Mountain, N.C. The 9310 series 100 CFM Conditioning Unit, for example, can generate an air stream with selected temperature and humidity. When blended with the dry air from the Dri-Air desiccant dryer, an gas stream with any temperature and humidity can be produced. Even though the Dri-Air system is a closed loop system, when humidified gas is injected into the loop, the pressure can be managed. The hopper is not completely air-tight and a vent valve in the loop can be cracked open to prevent excess loop pressure. Other inert carrier gases such as nitrogen could also be used.

In some embodiments, at the start of the drying process prior to extrusion, the target value of the RH of the drying gas could be set to a very low value to dry the resin very quickly. This target RH may be below the target value of RH that corresponds to the target polymer resin moisture content for extrusion. The drying gas dew point then may be initially set to, for example, −40 deg C. In this initial phase, the flow rate of moist gas stream 170 may be set to zero. However, before extrusion begins, the moisture content in the drying gas stream would be increased, by increasing the target RH, to provide an equilibrium moisture content of the resin a selected range, for example, 50 to 1000 ppm.

During this initial phase, the drying gas could be at an elevated temperature such as 60 to 70 deg C., however, the temperature could be lower, such as 25 to 30 deg C. In general, the drying gas temperature can be between 25 deg C. and 70 deg C. An advantage to keeping the temperature of the drying gas high in this initial phase is that the resin will come to an equilibrium moisture level more quickly. As long as the drying gas with a controlled and low level of moisture is fed into the hopper, the resin will remain at a fixed water content. In the second phase of the drying process prior to and during extrusion when the moisture content of the drying gas and polymer are controlled to be the target, the drying temperature may be 25 to 70 deg C., or more narrowly, 25 to 30, 30 to 40, 40 to 50, 50 to 60, or 60 to 70 deg C. In exemplary embodiments, the drying gas temperature is 60 to 70 deg C. in the initial phase and the temperature of the drying gas is 25 to 40 deg C. in the second phase.

Figure 5:
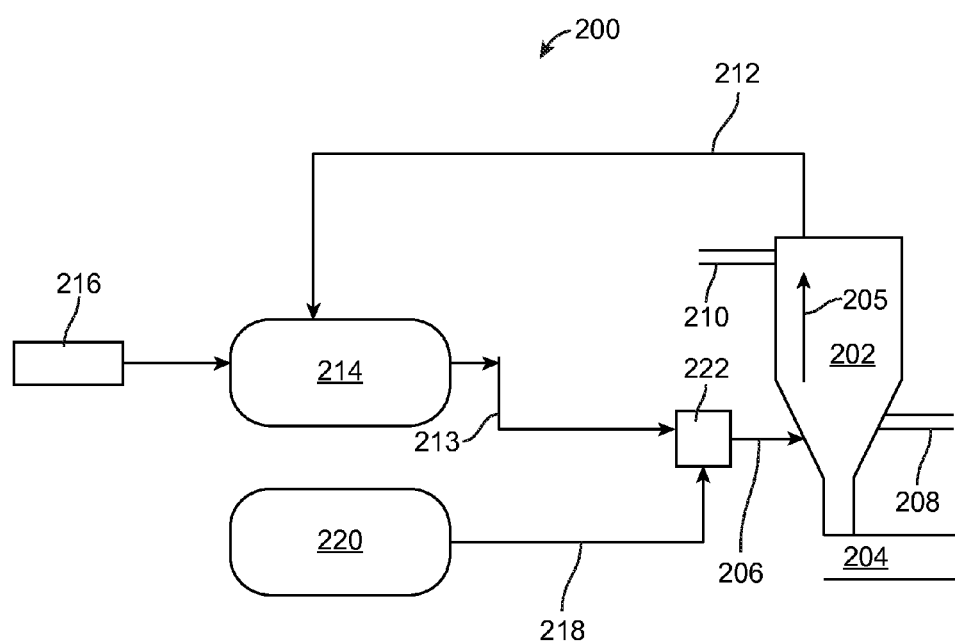
FIG. 5 depicts a schematic representation of another exemplary system for controlling moisture content of a polymer resin prior to and during extrusion with a drying gas having variable moisture content.

In other embodiments, a shutoff one way valve may be positioned between the drier unit and a source of pre-conditioned gas (e.g., tank of nitrogen, compressed air) with a fixed moisture content for injecting into a dry gas stream from the drier unit. The hopper/dryer which holds the resin may be fitted with two humidity sensors, one at the bottom of the hopper, just above the gas/air inlet source and the other at the top of the hopper/dryer. FIG. 5 depicts a schematic representation of another exemplary system 200 for controlling moisture content of a polymer resin prior to and during extrusion with a drying gas having variable moisture content. System 200 includes a resin hopper 202 that holds resin that is fed to an extruder 204.

A drying gas stream 206 with a variable moisture content enters hopper 202 and passes through the resin in the hopper, the direction of flow shown by an arrow 205. Hopper 202 has a humidity sensor 208 at the bottom of the hopper and a humidity sensor 210 at the top of the hopper for measuring the humidity at the exit and entrance of the hopper, respectively. A drying gas stream 212 exits hopper 202 and is directed to a drier unit 214 to generate a dry gas stream 213. Drier unit 214 removes moisture from drying gas stream 212 to generate dry gas stream 213 that is free or substantially free of moisture. A compressed air source 216 is used as a gas source for drier unit 214. Drying gas stream 206 with a selected moisture content is generated by injecting a moist gas stream 218 into dry gas stream 213.

The moisture content of the drying gas stream 206 is varied by adjusting amount of moist gas stream 218 that is injected into dry gas stream 213. The source of the moist gas stream 218 is a preconditioned gas tank 220 containing a gas (e.g., nitrogen or air) having a selected, constant moisture content which can be between 50 and 10,000 ppm. A shutoff one way valve 222 is positioned between drier unit 214 and preconditioned gas tank 220. Valve 222 controls the injection of moist gas stream 218 injected into dry gas stream 213, and therefore, the moisture content of drying gas 206. The measurements from humidity sensors 208 and 210 are used as feedback to valve 222 to adjust the moisture content of the drying gas 206 so that the resin is controlled to be within a specified tolerance of the target moisture content. The system is at a state of equilibrium when sensors 208 and 210 measure the same moisture content.

Another embodiment similar to that depicted in FIG. 4 is feeding a moist gas stream into the hopper having a constant relative humidity. The moist gas stream may be air or nitrogen with a moisture content of 50 and 2000 ppm. A slight positive pressure may be maintained in the hopper, for example, between 15 and 20 psi. Additionally, the temperature of the drying gas and in the hopper may be slightly elevated above ambient temperature, for example, the temperature may be between 20 and 40 deg C., or more narrowly between 30 and 35 deg C. Previous experiments by inventors have shown that PLLA water equilibration is surprisingly very rapid even at room temperature. Therefore, the resin is expected to respond quickly to the moist gas environment. The system is expected to reach equilibrium in less than 2 hours. Equilibrium will be demonstrated by the inlet gas moisture content equal to the outlet moisture content. Such a method would ensure that the resin would always have a constant moisture content as it is charged into the extruder.

Further embodiments of the present invention can include plasticization of a polymer resin for feeding into an extruder with substances other than moisture or water. In certain embodiments, carbon dioxide may be used to plasticize a polymer resin. In some embodiments, a gas containing carbon dioxide is passed through a polymer resin in a hopper. The gas may be 100% carbon dioxide and may be in a gas, liquid, or supercritical state. The gas may be a blend of carbon dioxide and another gas such as air, nitrogen or water.

The polymer resin absorbs the carbon dioxide and the carbon dioxide flow through the resin may be continued until it is saturated with carbon dioxide. The flow of carbon dioxide may be continued during the extrusion process. As disclosed above, the hopper may be sealed or have a positive pressure to minimize exposure of the resin to ambient moisture.

The carbon dioxide permeates into the resin and acts as a plasticizer during extrusion by reducing melt viscosity of the resin. Unlike moisture, carbon dioxide is inert to PLLA and has been used as a solvent to synthesize PLLA, and thus, will not cause chemical degradation of PLLA resin. Voda, S. et al. Polymer 45 (2004) 7839-7843. The plasticization by the carbon dioxide is expected to decrease the melt viscosity of the polymer resin in the extruder, allowing lower extrusion temperatures with reduced monomer generation and thermal degradation. Extrapolating published data on the solubility of carbon dioxide in PLLA to one atmosphere pressure, the solubility of $CO_2$ in PLLA at 25 deg C. is on the order of 0.5% or 5,000 ppm. Liao, X. et al. Polymer Int 2010; 59: 1709-1718.

The temperature of the gas may be 25 to 70 deg C., or more narrowly, 25 to 30, 30 to 40, 40 to 50, 50 to 60, or 60 to 70 deg C. The carbon dioxide content of the resin entering the extruder can be 500 to 10,000 ppm, 500 to 5000 ppm, 1000 to 2000 ppm, 2000 to 3000 ppm, 3000 to 4000 ppm, or 4000 to 5000 ppm.

In some embodiments, the gas may be dry or have a low moisture content. For example, the moisture content may be less than 1500 ppm. The dry gas stream passing through the resin can remove moisture from the resin to provide a low, consistent level of moisture in the polymer resin. The target moisture content of the resin may be less than 20 ppm, 20 to 50 ppm, 50 to 100 ppm, 100 to 300 ppm, 300 to 1000 ppm, or 50 to 1000 ppm. With regard to melt viscosity, a low level of moisture is not a problem since the carbon dioxide provides plasticization.

In some embodiments, rather than blending moist gas with a dry air stream, as described above and illustrate in FIGS. 5 and 6, carbon dioxide may be blended with a dry gas stream such as dry air or nitrogen. The relative volume percent of carbon dioxide may be 1% to 99%, or more narrowly, 1 to 10%, 10 to 50%, 50 to 80%, or 80 to 90%.

In certain embodiments, freon may be used to plasticize a polymer resin. In some embodiments, a gas containing freon may be added to or passed through the hopper containing the resin. The freon may be circulated through the hopper in a closed circulation loop. The polymer resin may absorb some of the freon. The flow of gas through the resin may be continued until it is saturated with the freon. The flow of the gas may be continued during the extrusion process.

In some embodiments, as described above for carbon dioxide, the gas may be dry or have a low moisture content. The target moisture content of the resin may be the same levels as described above for carbon dioxide since the freon plasticizes the resin.

The choice of type of freon for use as a plasticizer for the polymer resin may be dictated by several factors. These include that the freon be a solvent for the polymer resin and plasticizes the polymer resin melt. Additionally, the freon should be easily removed from an extruded product. Therefore, the freon should have a high vapor pressure of 300 torr or greater at 25 deg C., and be either a gas or a low boiling liquid under ambient conditions, i.e., 25 to 30 deg C. Consequently, the plasticizing agent will evaporate and be easy to remove from an extruded product. The rate of removal can be increased by heating the extruded product after extrusion. Additionally, the freon should be non-toxic and non-flammable. Table 1 is a list of freon plasticizers that are expected to be useful for extrusion of PLLA.

mean, average of the molecular weights of the individual segments, blocks, or polymer chains. Molecular weight is typical expressed in grams/mole which is referred to as "Daltons." It is determined by measuring the molecular weight of N polymer molecules, summing the weights, and dividing by N:

$$\overline{M}_n = \frac{\sum_i N_i M_i}{\sum_i N_i}$$

where Ni is the number of polymer molecules with molecular weight Mi. The weight average molecular weight is given by $$\overline{M}_w = \frac{\sum_i N_i M_i^2}{\sum_i N_i M_i}$$

where Ni is the number of molecules of molecular weight Mi Unless otherwise specified, "molecular weight" will refer to number average molecular weight (Mn).

"Semi-crystalline polymer" refers to a polymer that has or can have regions of crystalline molecular structure and amor-

TABLE 1

Potential Freons for Plasticizing PLLA.

| Compound | Boiling Point (C) | Toxicity | Flammability | Solubility Parameter $(cal/cm)^{1/2}$ |
|---|---|---|---|---|
| Fluoroform ($CHF_3$), Freon 23 | −82 | Non-toxic | Non-flammable | na |
| 1,1,2,2-tetrafluoroethane, HFC-134a | −26 | Non-toxic | Non-flammable | na |
| 2,2-dichloro-1,1,1-trifluoroethane HCFC-123 | 28 | Non-toxic | Non-flammable | na |
| 1,1,1,2,3,3,3-Heptafluoropropane HFC-227ea | −16 | Non-toxic | Non-flammable | na |
| Chloroform | 61 | Toxic | Non-flammable | 9.3 (p) |

For the purposes of the present invention, the following terms and definitions apply:

"Relative humidity" is a measurement of the amount of water vapor in a mixture of air and water vapor. It is most commonly defined as the partial pressure of water vapor in the air-water mixture, given as a percentage of the saturated vapor pressure under those conditions.

The "dew point" is the temperature to which a given parcel of humid air must be cooled, at constant barometric pressure, for water vapor to condense into water. The condensed water is called dew. The dew point is a saturation temperature. The dew point is associated with relative humidity. A high relative humidity indicates that the dew point is closer to the current air temperature. Relative humidity of 100% indicates the dew point is equal to the current temperature and the air is maximally saturated with water. When the dew point remains constant and temperature increases, relative humidity will decrease.

The term "molecular weight" can refer to one or more definitions of molecular weight. "Molecular weight" can refer to the molecular weight of individual segments, blocks, or polymer chains. "Molecular weight" can also refer to weight average molecular weight or number average molecular weight of types of segments, blocks, or polymer chains. The number average molecular weight (Mn) is the common, phous regions. The crystalline regions may be referred to as crystallites or spherulites which can be dispersed or embedded within amorphous regions.

The "glass transition temperature," Tg, is the temperature at which the amorphous domains of a polymer change from a brittle vitreous state to a solid deformable or ductile state at atmospheric pressure. In other words, the Tg corresponds to the temperature where the onset of segmental motion in the chains of the polymer occurs. When an amorphous or semi-crystalline polymer is exposed to an increasing temperature, the coefficient of expansion and the heat capacity of the polymer both increase as the temperature is raised, indicating increased molecular motion. As the temperature is increased, the heat capacity increases. The increasing heat capacity corresponds to an increase in heat dissipation through movement. Tg of a given polymer can be dependent on the heating rate and can be influenced by the thermal history of the polymer as well as its degree of crystallinity. Furthermore, the chemical structure of the polymer heavily influences the glass transition by affecting mobility.

The Tg can be determined as the approximate midpoint of a temperature range over which the glass transition takes place. [ASTM D883-90]. The most frequently used definition of Tg uses the energy release on heating in differential scanning calorimetry (DSC). As used herein, the Tg refers to a glass transition temperature as measured by differential scanning calorimetry (DSC) at a 20° C./min heating rate.

"Stress" refers to force per unit area, as in the force acting through a small area within a plane. Stress can be divided into components, normal and parallel to the plane, called normal stress and shear stress, respectively. Tensile stress, for example, is a normal component of stress applied that leads to expansion (increase in length). In addition, compressive stress is a normal component of stress applied to materials resulting in their compaction (decrease in length). Stress may result in deformation of a material, which refers to a change in length. "Expansion" or "compression" may be defined as the increase or decrease in length of a sample of material when the sample is subjected to stress.

"Strain" refers to the amount of expansion or compression that occurs in a material at a given stress or load. Strain may be expressed as a fraction or percentage of the original length, i.e., the change in length divided by the original length. Strain, therefore, is positive for expansion and negative for compression.

"Strength" refers to the maximum stress along an axis which a material will withstand prior to fracture. The ultimate strength is calculated from the maximum load applied during the test divided by the original cross-sectional area.

"Modulus" may be defined as the ratio of a component of stress or force per unit area applied to a material divided by the strain along an axis of applied force that results from the applied force. The modulus typically is the initial slope of a stress—strain curve at low strain in the linear region. For example, a material has both a tensile and a compressive modulus.

The tensile stress on a material may be increased until it reaches a "tensile strength" which refers to the maximum tensile stress which a material will withstand prior to fracture. The ultimate tensile strength is calculated from the maximum load applied during a test divided by the original cross-sectional area. Similarly, "compressive strength" is the capacity of a material to withstand axially directed pushing forces. When the limit of compressive strength is reached, a material is crushed.

"Toughness" is the amount of energy absorbed prior to fracture, or equivalently, the amount of work required to fracture a material. One measure of toughness is the area under a stress-strain curve from zero strain to the strain at fracture. The units of toughness in this case are in energy per unit volume of material. See, e.g., L. H. Van Vlack, "Elements of Materials Science and Engineering," pp. 270-271, Addison-Wesley (Reading, Pa., 1989).

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A method comprising
providing a bioresorbable polymer resin as feed to an extruder for an extrusion process;
controlling the moisture content of the polymer resin during the extrusion process prior to feeding to the extruder to be within a selected range between 50 ppm and 1000 ppm as the polymer resin is fed into the extruder; and
adjusting the moisture content of a drying gas stream passing through the polymer resin prior to being fed into the extruder to control the moisture content of the polymer resin;
wherein adjusting the moisture content of the drying gas stream comprises increasing the moisture content of the drying gas stream.

2. The method of claim 1, further comprising passing the drying gas stream through the polymer resin prior to starting the extrusion process, wherein the moisture content of the polymer resin is reduced to less than 1000 ppm prior to adjusting the moisture content of the drying gas stream.

3. The method of claim 1, wherein the moisture content of the drying gas stream is adjusted based on moisture content of the drying gas stream measured before passing through the polymer resin, after passing through the polymer resin, or both.

4. The method of claim 1, wherein the moisture content of the drying gas stream is adjusted to control the moisture content of the drying gas stream to be within a selected range of drying gas moisture content which corresponds to the selected range of moisture content of the polymer resin.

5. The method of claim 1, wherein the moisture content of the drying gas stream is adjusted to control the moisture content of the drying gas stream to be within a specified tolerance of a target moisture content, wherein the target moisture content of the drying gas stream corresponds to a target value of moisture content of the polymer resin within the selected range of the polymer resin moisture content.

6. The method of claim 1, wherein the drying gas stream includes a dry gas stream, wherein the moisture content of the drying gas stream is adjusted through variation of injection of a moist gas stream into the dry gas stream.

7. The method of claim 6, wherein the dry gas stream has a dew point of less than −40 deg C.

8. The method of claim 1, wherein the polymer resin is in a sealed container that minimizes leakage of ambient moisture into the container.

9. The method of claim 1, wherein adjusting the moisture content of the drying gas stream comprises decreasing the moisture content of the drying gas stream.

10. The method of claim 1, wherein the moisture content of the polymer resin during the extrusion process is controlled without adjusting a temperature of the drying gas stream.

* * * * *